Aug. 19, 1958 J. S. BOYERS 2,848,660

MASS DEMAGNETIZING DEVICE FOR MAGNETIC RECORDING MEDIA

Filed June 5, 1952

Inventor
John Spark Boyers by Hill, Sherman, Meroni, Gross & Simpson Attys

United States Patent Office 2,848,660

Patented Aug. 19, 1958

2,848,660

MASS DEMAGNETIZING DEVICE FOR MAGNETIC RECORDING MEDIA

John S. Boyers, Harvey, Ill., assignor, by mesne assignments, to Midwestern Instruments, Inc., Tulsa, Okla., a corporation of Delaware Application June 5, 1952, Serial No. 291,999

8 Claims. (Cl. 317—157.5)

This invention relates to a mass demagnetizing device for magnetic recording media, and more particularly to an arrangement in which a spool of magnetic wire or magnetic tape may be bodily inserted into the device and demagnetized without the necessity of uncoiling the wire or tape or transferring it to another spool. A disk of magnetic material may also be demagnetized by the apparatus of this invention.

One of the principal features and objects of the present invention is to provide a novel means for supporting a spool containing an elongated magnetic record medium in an intense magnetic field or for supporting a disk of magnetic material or a disk having a coating of magnetic material thereon in an intense magnetic field.

A further object and advantage of the present invention is to provide a novel apparatus for mass demagnetization of magnetic recording media in an intense magnetic field and in providing a novel energization circuit for the magnetic field which is immediately turned on when the mass of magnetic recording media is moved into the device but in which a time delay prevents the magnetizing field from being deenergized until a predetermined time after the mass of magnetic recording medium has been removed from the device.

Another and further object of the present invention is to provide a novel erasing means for a magnetic recording medium.

When a magnetic recording medium is to be reused after it has once been magnetized and had a record placed thereon, it is important that the magnetic medium be completely and uniformly demagnetized. It is furthermore important that this be done with a minimum amount of power and in an arrangement which produces a minimum amount of heat, as well as a minimum disturbance to other equipment in the vicinity. It is further important that the medium be withdrawn from the magnetic field while the magnetic field is still being maintained so that there is a gradual weakening of the magnetic field as the medium is being removed rather than having a substantially instantaneous decay of the magnetic field, as would result if the electric circuit were suddenly opened.

The novel features which I believe to be characteristic of my invention are set forth with particularity in the appended claims. My invention itself, however, both as to its organization, manner of construction and method of operation, together with further objects and advantages thereof, may best be understood by reference to the following description taken in connection with the accompanying drawings, in which:

Figure 1:
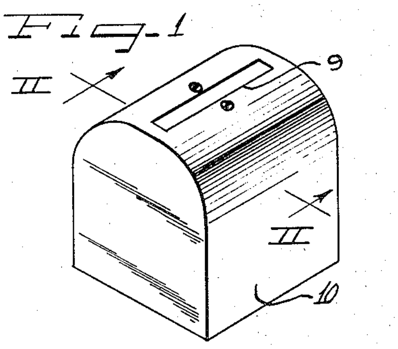
Figure 1 is an isometric view of a mass demagnetizing unit embodying the novel teachings and principles of the present invention.
Figure 2:
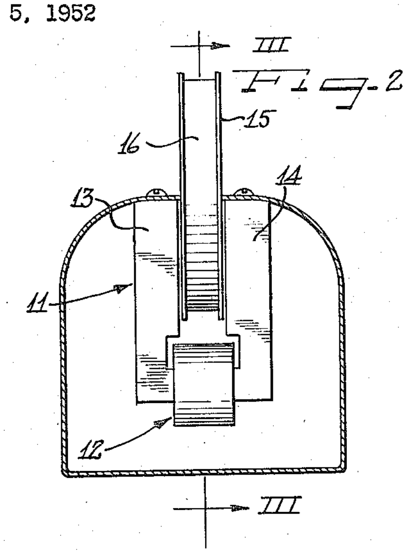
Figure 2 is a vertical sectional view through the mass demagnetizer unit as taken along the line II—II of Figure 1 and having a spool with a magnetic tape record member contained thereon and disposed in position to be demagnetized.
Figure 3:
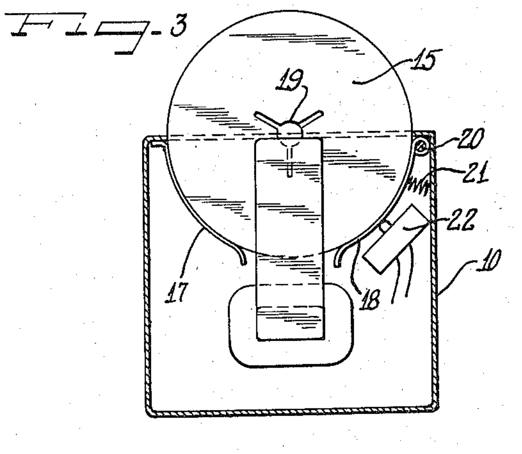
Figure 3 is a vertical sectional view of the mass demagnetizing unit as taken along the line III—III of Figure 2.

The first embodiment of the present invention as illustrated in Figures 1 to 3 of the drawings includes a housing 10, preferably formed of ferromagnetic material having relatively high permeability and low coercive force so as to constitute a magnetic shield as well as a housing element. Within the housing 10 is mounted a magnetic head unit including a generally U-shape core member 11 and an energizing coil 12. The core 11 is preferably laminated and includes a pair of pole portions 13 and 14 between which a portion of the lower half of a spool 15 of magnetic tape 16 is arranged to be disposed through an opening 9 in the top of the casing 10. The coil 12 is energized with an alternating current of sufficient value to create an intense magnetic field between the poles 13 and 14 of the core 11. This alternating intense magnetic field will demagnetize all of that portion of the magnetic tape 16 which lies between the poles 13 and 14.

It will thus be apparent that if the spool 15 is now turned through slightly more than 360°, all of the tape contained on the spool 15 will be demagnetized. In order that the spool 15 may be conveniently supported so as to dispose the lower portion of the spool between the poles 13 and 14 and also to permit it to be turned, a convenient supporting arrangement is provided. As may be seen in Figure 3 of the drawing, the casing is provided with arcuate shelf portions 17 and 18 on opposite sides of the coil 12 and the core 11. These shelf portions 17 and 18 provide a convenient seat for the spool 15 and also permit it to be turned thereon, without the necessity of directly supporting the spool 15 on a spindle extending through the central opening 19 of the spool 15. This, of course, enables the spool 15 to be simply dropped into place through the opening 9 in the casing 10.

In order to provide a control feature hereinafter to be explained, one of the arcuate shelf portions 18 is pivotally mounted as at 20 to the housing 10 and is arranged for limited angular movement between stops (not shown). A spring 21 normally biases the arcuate shelf portion 18 toward the slot 9 in the housing 10. Below the shelf portion 18 is mounted a micro-switch 22 which is a normally open type switch but which is closed when the weight of a spool 15 is dropped into the slot 9 onto the shelf portions 17 and 18. More specifically, the weight of the spool 15 depresses the shelf portion 18 downwardly about its pivot point 20 to actuate the microswitch 22.

Figure 5:
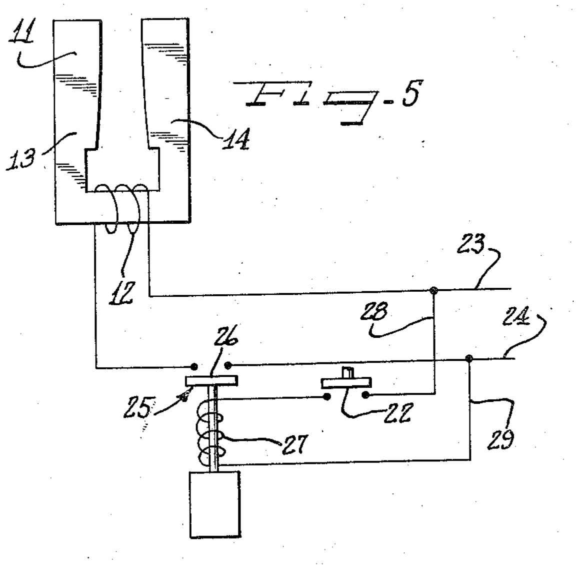
Figure 5 is a circuit diagram indicating the manner in which the mass demagnetizing units shown in Figures 1 to 4 are energized.

One form of energizing circuit for the coil 12 is shown in Figure 5 of the drawing, wherein power is supplied through suitable power supply conductors 23 and 24. A time delay switch 25 is inserted in this circuit and is of any suitable type which closes immediately but which has some predetermined time delay in opening. This is diagrammatically illustrated in Figure 5 as including a bridging contact 26 in the main circuit of the energizing coil 12. The control winding 27 for actuating the bridging contact 26 is energized through conductors 28 and 29 coming off of conductors 23 and 24, the microswitch 22 being disposed in this control circuit.

In operation, when a spool 15 containing a magnetic record medium 16 is dropped into the slot 9 of the casing 10, it seats upon the shelf portions 17 and 18 and causes the microswitch 22 to be closed. This immediately closes the bridging contact 26 of the switch 25 and energizes the coil 12. An intense alternating magnetic field is established between the poles 13 and 14 and demagnetizes the record medium which lies between the pole portions 13 and 14. The spool 15 is gradually turned by hand or otherwise so that all segmental portions of the spool lie, at one time or another, between the pole portions 13 and 14. Thus, one complete revolution of the spool 15 causes all of the magnetic record medium 16 wound thereon to be demagnetized. The spool is now lifted out of the slot 9 and the casing 10. This causes the microswitch 22 to open and the coil 27 of the switch 25 to be deenergized. The bridging contact 26 does not immediately open, however, due to the fact that this is a time delay switch and thus a predetermined time elapses before the coil 12 is deenergized. This prevents an instantaneous reduction of the field at the time when the spool 15 is still within the slot 9 of the casing 10.

Figure 4:
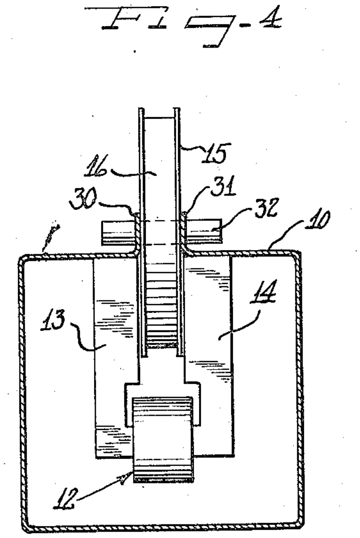
Figure 4 is a view similar to Figure 2 but showing a modified form of the present invention.

A modified form of the present invention is shown in Figure 4 of the drawing. In this arrangement, the housing 10 is provided with a pair of upstanding ears 30 and 31 which carry a short spindle 32. The spindle 32 is rotatably supported in the ears 30 and 31 and it is detachable therefrom. Thus, when the spool 15 containing the magnetic record medium 16 is disposed in the slot 9 of the casing 10, it is supported on the spindle 32 rather than on the shelf portions 17 and 18 as described in connection with Figures 2 and 3 of the drawings. The energizing coil 12 of the unit in this form of the invention may be energized and controlled in any suitable manner.

While I have illustrated and described a spool having a tape magnetic record medium wound thereon, in connection with the forms of the inventions shown in the various figures of the drawing, it will, of course, be understood that spools containing wire may likewise be demagnetized as may also disk record members or other flat sheet or belt record members.

As shown in Figure 5 of the drawing, the poles 13 and 14 may be slightly tapered or flared, if desired, to provide a fairly uniform magnetic field throughout the effective area.

While I have shown the particular embodiments of my invention, it will, of course, be understood that I do not wish to be limited thereto since many modifications may be made and I, therefore, contemplate by the appended claims to cover all such modifications as fall within the true spirit and scope of my invention.

I claim as my invention:

1. A bulk treating device comprising an upright housing having an elongated slot at the top thereof with elongated parallel sides and opposite ends, a generally U-shaped magnetic core in said housing having upwardly extending legs terminating adjacent the respective sides of said slot to provide poles on opposite sides of the space beneath said slot, the space between the poles being directly beneath and vertically aligned with said slot, and arcuate shelf portions carried within said housing beneath said slot to provide supporting surfaces extending arcuately downwardly and inwardly from the respective ends of said slot, the space between the shelf portions intersecting the space between said poles and lying directly beneath and vertically aligned with said slot.

2. A bulk treating device comprising a housing, a generally U-shaped magnetic core in said housing having generally parallel legs, said housing having an opening providing access to the space between said legs, a coil linking said core to establish a magnetic field in the space between said legs, arcuate shelf portions carried within the housing on opposite sides of the space between the legs of said core and providing supporting surfaces, said supporting surfaces defining a generally semi-cylindrical space intersecting the space between the legs, switch means controlling energization of said coil and having actuating means therefor disposed adjacent one of said shelf portions, and said one shelf portion being movable to actuate said actuating means to accommodate energization of said coil.

3. A bulk treating device comprising a housing, a generally U-shaped magnetic core in said housing having legs extending generally parallel to define spaced magnetic poles, arcuate shelf portions carried within the housing on opposite sides of the space between the poles to define a generally semi-cylindrical space intersecting the space between the poles, said housing having an opening providing access from the exterior of the housing to said semi-cylindrical space, one of said shelf portions having a horizontal pivot for accommodating pivotal movement of said one shelf portion to increase said semi-cylindrical space, a coil linking said coil to establish a magnetic field in the space between said poles, and switch means controlling energization of said coil and having an actuating member disposed for actuation by pivotal movement of said one shelf portion to accommodate energization of said coil.

4. A bulk treating device comprising a generally U-shaped magnetic core having spaced generally parallel legs defining magnetic poles, a coil linking said core for energizing the core to establish a magnetic field between said poles, a time delay switch controlling energization of said coil, said time delay switch being operative to accommodate energization of said coil upon energization thereof and being operative upon deenergization thereof to interrupt energization of said coil after a predetermined time delay, and switch means controlling energization of said time delay switch and having an actuating member disposed adajacent the space between said poles for actuation by insertion of an object of predetermined configuration in said space to energize said time delay switch and for deactuation by removal of the object from said space to deenergize said time delay switch, whereby said coil is deenergized after a predetermined time delay upon removal of the object from the space between the poles.

5. A mass demagnetizing device including a pair of upstanding spaced confronting magnetic poles for receiving a spool of magnetic recording medium disposed generally in an upright orientation with substantially a lower radius sector of the spool in the space between said magnetic poles and the spool having a peripheral rim, means for supporting said spool by said rim with the lower radius sector of said spool between said poles, said supporting means accommodating sliding movement of said rim thereon for rotational movement of said spool to successively place all portions of said medium in segmental increments between said poles, means for automatically establishing an intense alternating magnetic field between said poles when said spool is disposed on said supporting means, and means for automatically maintaining said intense alternating magnetic field for a predetermined time after said spool is removed from between said poles.

6. A bulk treating device including a pair of spaced confronting upstanding magnetic poles for receiving a spool of magnetic recording medium with a lower radius portion thereof disposed between said poles, and a pair of arcuate shelves disposed on opposite sides of the space between said poles for supporting said spool with substantially a complete radial segment thereof between said poles, said shelves accommodating sliding movement of said spool relative thereto whereby said spool may be turned to successively place substantially all portions of said spool between said poles, and means for establishing an intense magnetic field between said poles.

7. A bulk treating device comprising a pair of spaced confronting magnetic poles extending upwardly in parallel relation for receiving a spool of magnetic recording medium with a lower radial segment thereof disposed in the space between said poles, a pair of arcuate shelves disposed on opposite sides of the space between said poles and peripherally supporting said spool for rotation to successively place substantially all portions of said spool between said poles, an electrical energizing circuit linking said magnetic poles for establishing an intense magnetic field between said poles, at least one of said arcuate shelves being mounted for limited angular movement in the downward direction in response to the weight of said spool being placed thereon, and a switch controlling said electrical energizing circuit and actuated by the downward angular movement of said one arcuate shelf to establish the magnetic field between said poles when the weight of the spool is supported by said one shelf.

8. A bulk treating device comprising a pair of spaced confronting elongated magnetic poles for receiving a spool of magnetic recording medium with a radial segment thereof between said poles, means for supporting said spool to place successively all portions of said medium in segmental increments between said poles, and means for establishing an intense magnetic field between said poles, said poles being tapered away from each other to provide a flaring non-magnetic gap which increases from the central portion of the spool to the peripheral portion of the spool, thereby to provide a substantially uniform magnetic field.

References Cited in the file of this patent

UNITED STATES PATENTS

| | | |
|---|---|---|
| 599,304 | Storrs | Feb. 15, 1898 |
| 2,288,862 | Weitmann et al. | July 7, 1942 |
| 2,481,392 | Camras | Sept. 6, 1949 |
| 2,501,615 | Pugh | Mar. 21, 1950 |
| 2,550,753 | Andrews | May 1, 1951 |